(12) United States Patent
Ormson

(10) Patent No.: US 7,295,840 B2
(45) Date of Patent: Nov. 13, 2007

(54) METHOD OF NETWORK ACQUISITION AND RELATED CELLULAR RADIO COMMUNICATION DEVICE

(75) Inventor: Richard Ormson, Berkshire (GB)

(73) Assignee: NEC Corporation (JP)

( * ) Notice: Subject to any disclaimer, the term of this patent is extended or adjusted under 35 U.S.C. 154(b) by 180 days.

(21) Appl. No.: 10/807,995

(22) Filed: Mar. 24, 2004

(65) Prior Publication Data

US 2004/0248572 A1 Dec. 9, 2004

(30) Foreign Application Priority Data

Mar. 25, 2003 (GB) .................................. 0306839.2

(51) Int. Cl.
*H04Q 7/20* (2006.01)
(52) U.S. Cl. ...................... 455/434; 455/455
(58) Field of Classification Search ................ 455/434, 455/161.3, 552.1, 513, 514, 515, 421, 422.1, 455/435.1, 435.2, 435.3, 436–438, 450, 452.2, 455/62, 455, 423, 524–525, 67.11, 432.1, 455/464, 512, 516; 370/329, 331
See application file for complete search history.

(56) References Cited

U.S. PATENT DOCUMENTS

| | | | |
|---|---|---|---|
| 5,504,803 A | | 4/1996 | Yamada et al. |
| 6,223,037 B1 * | | 4/2001 | Parkkila ..................... 455/434 |
| 6,223,043 B1 | | 4/2001 | Hazama |
| 6,311,064 B1 * | | 10/2001 | Bamburak et al. .......... 455/434 |
| 6,363,255 B1 * | | 3/2002 | Kuwahara ................ 455/456.5 |
| 6,628,946 B1 * | | 9/2003 | Wiberg et al. .............. 455/434 |
| 6,633,760 B1 * | | 10/2003 | Ham et al. ................ 455/422.1 |
| 6,775,543 B2 * | | 8/2004 | Itazu et al. .................. 455/423 |
| 7,149,518 B2 * | | 12/2006 | Attimont et al. ............ 455/434 |
| 2002/0155815 A1 | | 10/2002 | Richter |
| 2002/0197992 A1 * | | 12/2002 | Nizri et al. ................. 455/435 |

(Continued)

FOREIGN PATENT DOCUMENTS

EP        1 059 825 A1    12/2000

(Continued)

OTHER PUBLICATIONS

Search Report issued by European Patent Office on Jul. 20, 2004 in connection with corresponding European patent application No. 04 007 222.5.

(Continued)

*Primary Examiner*—George Eng
*Assistant Examiner*—Nam Huynh
(74) *Attorney, Agent, or Firm*—Ostrolenk, Faber, Gerb & Soffen, LLP

(57) ABSTRACT

The present invention provides for a method for use in network acquisition in a cellular radio communications device comprising the steps of, storing details of the cell to which the device was connected at the time of loss of the network for at least first and second separate instances of network loss, comparing the current cell appearing at the time of seeking network establishment with the stored cell details, camping on the current cell by means of the stored cell details if the comparison indicates a match, and conducting a network cell search if the comparison does not identify a match between the current cell and one of the stored cells.

17 Claims, 2 Drawing Sheets

U.S. PATENT DOCUMENTS

2003/0040311 A1* 2/2003 Choi et al. ............... 455/434
2004/0203839 A1* 10/2004 Ostberg et al. ........... 455/455
2004/0203855 A1* 10/2004 Veerasamy et al. ...... 455/456.1

FOREIGN PATENT DOCUMENTS

| WO | WO97/36449 | 10/1997 |
|---|---|---|
| WO | WO 00/31998 | 6/2000 |

OTHER PUBLICATIONS

Chinese Patent Office Action issued on Jan. 19, 2007 in connection with corresponding Chinese patent application No. 2004100317785 with English translation.

* cited by examiner

METHOD OF NETWORK ACQUISITION AND RELATED CELLULAR RADIO COMMUNICATION DEVICE

BACKGROUND OF THE INVENTION

The present invention relates to a method for use in network acquisition, and to a related cellular radio communication device.

The dead time that arises between the turning on of a cellular phone and network acquisition has for sometime been the subject of review and research in an attempt to limit the extent of such wasted time and its associated problems. For example, it has been noted that such dead time is a cause of irritation to the user, and the longer the time taken to achieve network acquisition subsequent to turning on the cellular device, the greater the irritation caused.

Also, the network acquisition procedure conducted during this period is one that requires a significant amount of power to be expended within the hand set. Thus as handsets move to dual mode or multimode functionality, the potential for such aforementioned irritation and power expense is likely to increase yet further. Within dual mode or multimode handsets, there are of course a plurality of sets of frequencies to search and so connecting to the most attractive cell on the best network will take proportionately longer and the power consumed will be correspondingly proportionately higher.

Also, certain specifications arising in accordance with mobile network standards also place constraints upon the operation of a mobile handset within a cellular network, which can also have disadvantageous effect on the above-mentioned dead time. For example, under 3GPP (3rd Generation Partnership Project) specifications, a handset is required to search one entire radio access technology (RAT) at a time. The relative priority of RATs is set within the handset and so, for example, a dual mode GSM (Global System for Mobile Communication)/UMTS (Universal Mobile Telecommunication System) handset will first search either on the GSM or UMTS radio technology, and will only look at the second RAT during initial selection if no suitable cells are found on the first RAT.

While improvements in the initial search procedures have been made in an attempt to reduce the dead time experienced by the user and/or to reduce the handset energy consumption, further advances in improving the efficiency of network acquisition are still desired.

In some handsets a procedure is provided whereby, before starting a scan of a network, the handset is arranged to look for the base station that it was last attached to before the handset was turned off. Thus, on subsequent turn on at the handset, if the handset has not changed location, the handset can camp on the cell relatively rapidly in view of the information retained concerning the base station previously attached to. A handset arranged to operate in such a known cell mode can then camp on the cell within a period in the region of 1 second, as compared with periods of up to 30 seconds when conducting a full cell search.

Such known cell operation is disadvantageously limited since its successful operation is dependent very much upon the user turning off their handset, and subsequently turning on a handset, at the same location and this will rarely hold true.

SUMMARY OF THE INVENTION

The present invention seeks to provide for a method for use in network acquisition, and related cellular radio communications device, having advantages over known such methods and devices.

According to a first aspect of the present invention, there is provided a method for use in network acquisition in a cellular radio communications device, comprising the steps of storing details of the cell, as cell information, to which the device was connected at the time of loss of the network for at least first and second separate instances of network loss, attempting network establishment on the basis of the stored details of one of the stored cells, camping on the one stored cell if available but attempting network establishment on the basis of the stored details of the other of the cells if the one stored cell is not available, camping on the other of the cells if available, and conducting a network cell search if none of the stored cells are available.

The present invention is particularly advantageous in that, through storing a plurality of previous cell details that were in existence at the time of network loss, the process of network acquisition can be advantageously reduced without limitations currently experienced.

In particular, the pattern of previous network loss can advantageously relate to a particular pattern of travel/usage by an individual such that a limited number of stored cell details can be employed to account for a proportionally, and advantageously, high range of rapid cell acquisitions.

In order not to unduly expend a disproportioned amount of time in checking for a match with stored cell details, the number of cells having their details stored can be advantageously limited.

In particular, the number of cells can be limited to those who's details can be checked in a period in the region of 0.5 seconds. In particular, the number of cells can advantageously be limited to 20 or less.

The method can also include the step of ensuring that the details of a cell to be stored have not previously been stored so as to avoid duplication of stored data.

Also, the method can be employed both where the network loss arises from the handset moving out of a coverage area, or through the user turning off the handset, such as may occur before travelling by, for example, taking a flight.

Of course, a full cell search is initiated as part of a fall-back position should it not be possible to achieve network connectivity on the basis of the cells whose details have been stored.

According to another aspect of the present invention, there is provided a cellular radio communication device having storing means for storing details of the cell to which the device was connected at the time of loss of the network for at least first and second instances of network loss, means for attempting network establishment on the basis of one of the first and second stored cells, means for attempting network establishment on the basis of the other of the first and second stored cells if the one of the first and second cells is not available, and means for initiating a network cell search if none of the stored cells are available for network camping.

The present invention can therefore advantageously be employed if, for example, the mobile handset is turned off prior to an aircraft journey, and then turned on subsequent to completion of the aircraft journey and, for example, also prior to, and after, a car journey.

Principally therefore the present invention has a particular merit in instances where the location of the handset will change subsequent to the handset being turned off and on or to it being turned on.

Of course, this is particularly advantageous in situations where the handset might suffer network loss through moving out of a coverage area, for example when passing through a tunnel since the present invention can be automatically invoked at the time the user and handset reappear from the tunnel.

In particular, if the tunnel is used regularly by the user as part of, for example, their commute to work, the cell details arising at each end of the tunnel will then advantageously be stored in the mobile handset so that reestablishment can be achieved quickly and efficiently both on the user inbound and outbound journey.

The stored details, namely, cell information, for speeding the cell search advantageously comprise identification of the radio access technology and the carrier frequency. Also, details such as WCDMA code, GSM cell identification can be stored to assist with finding the correct network.

BRIEF DESCRIPTION OF THE DRAWINGS

The present invention is described further hereinafter, by way of example only with reference to the accompanying drawings in which.

DESCRIPTION OF THE PREFERRED EMBODIMENTS

Figure 1:
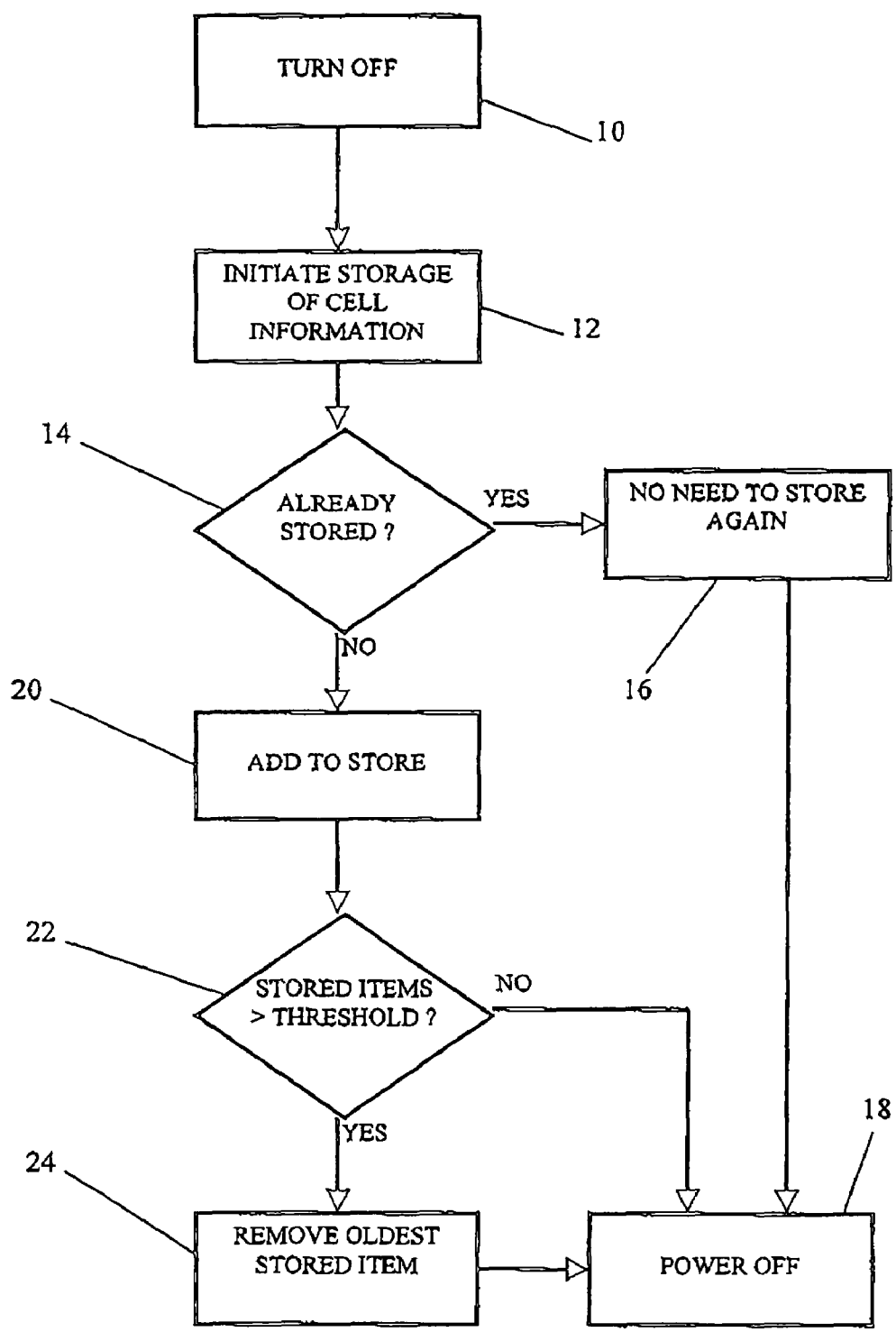
FIG. 1 is a flow diagram illustrating the operation of a method embodying the present invention at the time of turning off a handset.

Turning first to FIG. 1, there is illustrated a flow diagram arising at the time of turning off a handset.

As will be appreciated, such turning off can also equate to the handset losing a network through moving out of a coverage area etc.

At step 10, a decision is made to turn off the handset and the user presses the appropriate button to initiate this procedure.

Turning off the handset serves to initiate storage of the current cell information at step 12 and the current cell details are compared with those already stored within the handset at step 14. If the current cell details are found to already be stored within the handset, the method proceeds by route YES to step 16 where it is determined therefore that there is no need to store the current cell details and the turn off procedure then moves to completion at power off stage 18.

If, however at step 14, it was determined that the cell details have not previously been stored, the method proceeds via route NO and adds the current cell details to the store at step 20.

Upon adding the current cell details, it is determined at step 22 whether the total number of cells whose details have been stored exceeds a threshold value. Advantageously, the threshold value is determined such that the number of cells whose details are to be checked at subsequent turn on of the handset is limited such that the total checking time is in the region of 0.5 seconds. In the present example, the threshold value is set at 20.

If the threshold value has not been reached, the method proceeds from block 22 via route NO to the power off stage 18.

If, however, the addition of the current cell details will move the total cell count above 20 within the store, the method proceeds from step 22 via route YES to step 24 at which the oldest stored item is removed from the store and the method then proceeds to the power off stage 18.

Figure 2:
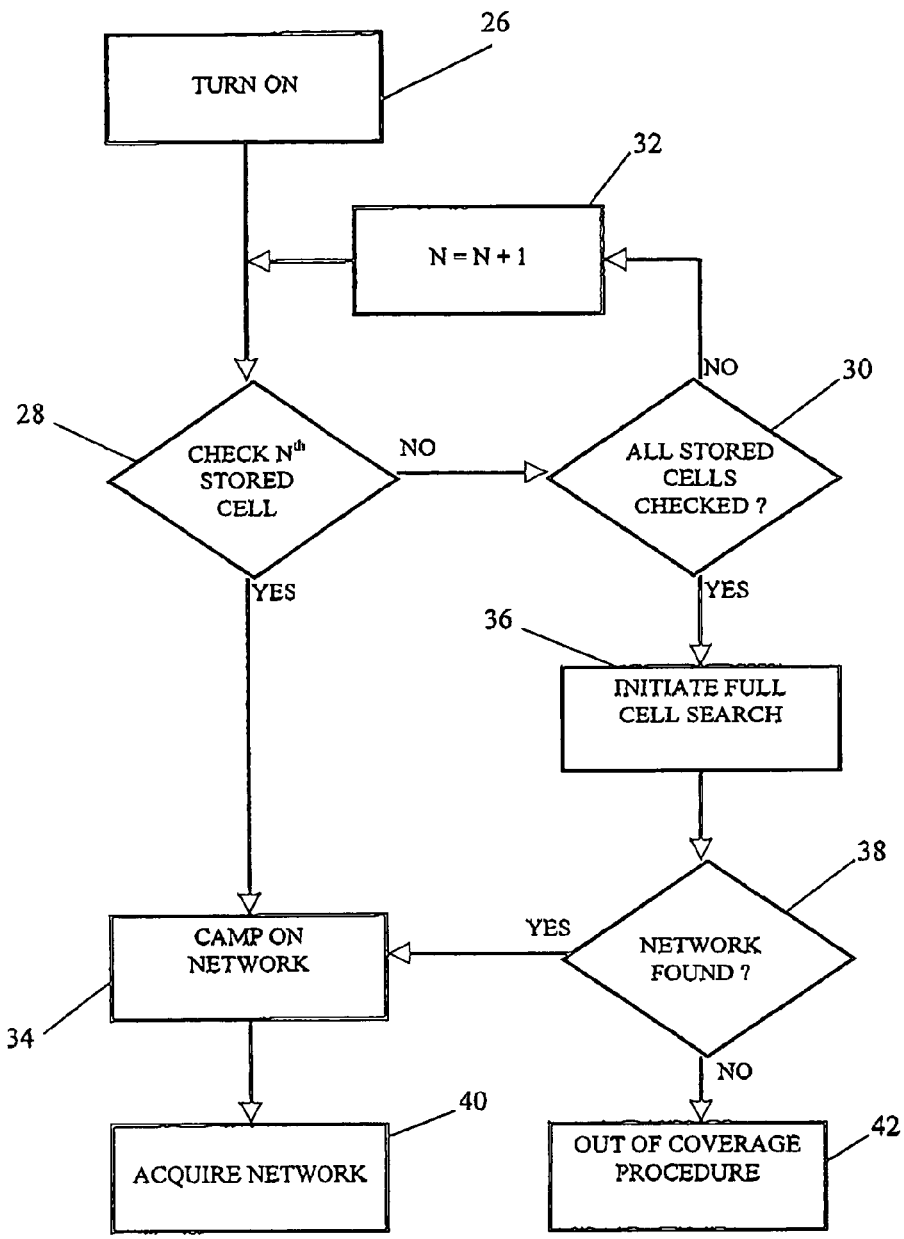
FIG. 2 is a flow diagram illustrating operation of a method according to the present invention at the time of turning on the handset.

Subsequent turning on the handset is discussed in relation to the flow diagram of FIG. 2.

At step 26, the user initiates a turning on procedure by pressing the appropriate button(s) on the handset.

The handset then determines whether network acquisition can be achieved on the basis of one of the stored cells. At step 28, a first of the stored cells is checked. If this stored cell does not allow for acquisition then the procedure continues to step 30 where it is determined whether or not all stored cells have been checked. If not all stored cells have been checked, then the cell to be checked is incremented at step 32 and the next cell then checked at step 28. If at step 28 it is found that the network can be acquired on the basis of the cell last checked, the network camping and acquisition is concluded at steps 34 and 40. If at step 30 it is determined that all cells have been searched, then a full cell search in the hope of achieving network acquisition in the normal manner is initiated at step 36, and omitting those cells already checked at step 28. If at step 36 a full cell search is initiated, it is then determined at step 38 whether a network is found. If so, the procedure continues via steps 34 and 40. However, if a network is not found at step 38, the procedure follows the NO route to initiate an out of coverage procedure at step 42.

In instances where a match is therefore found between the cell details previously stored and the cell to which connection is to be made, it should be appreciated that the dead time experienced between turning the handset on and achieving network acquisition is advantageously greatly reduced as is the potential for irritation to the user and the amount of power then employed in the network acquisition procedure.

The present invention therefore advantageously allows the "known cell" mode to operate in more than one location. In storing the cell details at handset turn off for a number of instances of handset turn off—eliminating any duplicate details—the details of cells where the handset user is likely to turn off his phone, and thus of where he is likely to turn it on again, are readily available.

For example, a traveler flying out of Heathrow will turn off their phone as they board the aircraft. They will then turn it back on at their destination. They will then turn if it off again as they board to return to Heathrow. In this case, and insofar as the cell information from the last two turn offs has been stored, the phone will immediately reconnect when turned back on at Heathrow.

As another example, a commuter turns off their phone to drive to work, and turns it back on upon arrival. When returning home they repeat this exercise but in reverse. Again, if the data for the last two turn offs is stored, it is possible to quickly and accurately achieve network acquisition at either end of the journey.

Of course, real world use is not limited to simple trips as shown above. However, for most users, if we store a small number of sets of cell information, most locations at which they are likely to turn on their handsets are covered. As noted above however, it is prudent to limit the number of sets of cell details stored-if the list is too long then the time taken to check it becomes excessive and a full search might as well be run. However, the details of the number of cells that can be checked in, for example, half a second can be readily stored. Also, if the known cell method fails and a full search has to be run the user would not notice this small additional time. Using current radios it is possible to check about 20 cells in this time and such number of cells is enough to accommodate the regular routes of most travelers.

As also noted above, the present invention can be employed for "out of zone" searches—when a phone passes out of a network coverage area, a search is periodically run to see if the network has reappeared. If the last cell information before the handset went out of coverage is stored in the same way as the turn off information above, the phone's usefulness to people who regularly travel a route through an area of poor network coverage—for example those who commute on tram routes with tunnels, is greatly enhanced. Also, such out of zone activity occurs periodically when a phone is switched on but not camped on a network and so the present invention finds advantageous use for such periodic out of zone searches.

What is claimed is:

1. A method for use in network acquisition in a cellular radio communications device comprising the steps of:
   a. storing details of the cell, as cell information, to which the device was connected at the time of loss of the network for at least prior first and second separate instances of network loss;
   b. attempting network establishment on the basis of the stored details of one of the stored cells;
   c. camping on said one of the stored cells if available;
   d. attempting network establishment on the basis of the stored details of one of the other of the stored cells if said cellular radio communications device is not camped on one of the stored cells;
   e. camping on one of the other of the stored cells if available;
   f. returning to step d as long as there are stored cells, the stored details of which have not yet been used as the basis to attempt network establishment, or as long as said cellular radio communications device is not camped on one of the stored cells;
   g. conducting a network cell search if none of the stored cells are available; and
   h. if none of the cells searched in the network cell search are available, repeating steps b through g, inclusive, upon a predetermined time interval elapsing after the completion of step g.

2. A method as claimed in claim 1, and including the step of limiting the number of cells whose details are stored.

3. A method as claimed in claim 2, wherein the number of cells is limited to a number who details can be compared with the current cell details such in a period in the region of 0.5 seconds.

4. A method as claimed in claim 2, and including the step of limiting the number of cells whose details are stored to no more than 20.

5. A method as claimed in claim 1, and including the step of identifying whether the cell details to be stored have already been stored.

6. A method as claimed in claim 1, wherein the network loss occurs through movement of the handset out of a coverage area.

7. A method as claimed in claim 1, wherein the network loss arises through the cellular radio communication device being turned off.

8. A method as claimed in claim 1, wherein the network cell search is arranged to omit frequencies of stored cell details already attempted.

9. A method as claimed in claim 1, wherein the cell information comprises identification of a radio access technology and a carrier frequency.

10. A cellular radio communication device including the following components:
    a. storing means for storing details of the cell, as cell information, to which the device was connected at the time of loss of the network for at least prior first and second instances of network loss;
    b. means for attempting network establishment on the basis of one of the at least first and second stored cells;
    c. means for camping on the network if said one of the at least first and second stored cells is available;
    d. means for attempting network establishment on the basis of the others of the at least first and second stored cells if said one of the at least first and second stored cells is not available;
    e. means for camping on the network if said one of the at least first and second stored cells is not available and if one of the others of the at least first and second stored cells is available;
    f. means for initiating a network cell search if none of the stored cells are available for network camping; and
    g. means for using components b through f, inclusive, to attempt network establishment at periodic time intervals after the completion of the network cell search so long as the network is not successfully established.

11. A device as claimed in claim 10, and including means for limiting the number of cells whose details are stored.

12. A device as claimed in claim 11, wherein said number of cells is limited to a number that can be compared with the current cell details in a period in the region of 0.5 seconds.

13. A device as claimed in claim 11, and including means for limiting the number of cells whose details are stored to no more than twenty.

14. A device as claimed in claim 10, and including means for identifying whether the cell details to be stored have already been sorted.

15. A device as claimed in claim 10, wherein the network loss occurs through movement of the handset out of a coverage area.

16. A device as claimed in claim 10, wherein the network loss arises through the cellular radio communication device being turned off.

17. A method for use in network acquisition in a cellular radio communication device comprising the steps:
    on turn off of the radio communication device,
    identifying whether or not the current cell details that are the details at the turn off of the radio communication device are already stored;
    shifting to a power off stage without storing of the current cell details, if the current cell details have been stored;
    storing the current cell details, if the current cell details have not been stored;
    determining whether or not the total number of cells whose details have been stored exceeds a threshold value;
    shifting to the power off stage, if the threshold value has not been reached;
    removing the oldest stored cell details from the stored cell details and shifting to the power off stage, if the threshold value has been reached;
    on turn on the radio communication device,
    checking whether or not the network acquisition can be achieved on the basis of one of the stored cell details;
    performing the network camping and acquisition, if the network acquisition can be achieved;
    checking whether or not all stored cells have been checked, if the one of the stored cell does not allow for the network acquisition;
    incrementing the cell details as the next cell details to be checked, if not all stored cells have been checked;
    performing a full cell search in the normal manner, if all stored cells have been checked;
    determining whether or not the network is found by the full cell search;
    performing an out of coverage procedure, if the network is not found by the full cell search; and
    performing the network camping and acquisition, if the network is found by the full cell search.

* * * * *